United States Patent
Wise et al.

(10) Patent No.: US 9,232,238 B2
(45) Date of Patent: Jan. 5, 2016

(54) SYSTEM AND METHOD FOR PIXEL DATA COMPRESSION

(71) Applicant: Nvidia Corporation, Santa Clara, CA (US)

(72) Inventors: Joshua Wise, Santa Clara, CA (US); Stephen Lew, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 126 days.

(21) Appl. No.: 14/156,952

(22) Filed: Jan. 16, 2014

(65) Prior Publication Data

US 2015/0201219 A1 Jul. 16, 2015

(51) Int. Cl.
| | |
|---|---|
| *G06K 9/36* | (2006.01) |
| *H04N 19/91* | (2014.01) |
| *H04N 19/182* | (2014.01) |
| *H04N 19/156* | (2014.01) |
| *H04N 19/13* | (2014.01) |

(52) U.S. Cl.
CPC ............ *H04N 19/91* (2014.11); *H04N 19/13* (2014.11); *H04N 19/156* (2014.11); *H04N 19/182* (2014.11)

(58) Field of Classification Search
CPC ...... G06T 9/008; H04N 19/00; H04N 19/102; H04N 19/103; H04N 19/115; H04N 19/12; H04N 19/122; H04N 19/129; H04N 19/13; H04N 19/14; H04N 19/146; H04N 19/147; H04N 19/15; H04N 19/156; H04N 19/167; H04N 19/176; H04N 19/182; H04N 19/186; H04N 19/187; H04N 19/1883; H04N 19/196; H04N 19/30; H04N 19/34; H04N 19/36; H04N 19/593; H04N 19/61; H04N 19/63; H04N 19/635; H04N 19/647; H04N 19/70; H04N 19/89; H04N 19/91; H04N 19/94; H04N 19/98; G06F 17/148; H03M 7/30; H03M 7/40; H03M 7/4006; H03M 7/425

See application file for complete search history.

(56) References Cited

U.S. PATENT DOCUMENTS 5,606,370 A * 2/1997 Moon ............... 375/240.23
6,944,350 B2 * 9/2005 Budge et al. ............... 382/240

* cited by examiner

Primary Examiner — Jose Couso

(57) ABSTRACT

A system for, and method of, pixel data compression and a smartphone incorporating the system or the method. In one embodiment, the system includes: (1) a differential pulse code modulation encoder operable differentially to compress the two pixel values losslessly to yield two losslessly compressed pixel values and (2) an entropy encoder coupled to the differential pulse code modulation encoder and configured to receive and entropy-encode the losslessly compressed pixel values using a tiered technique to yield entropy-encoded, losslessly compressed pixel values. values using a tiered technique to yield Huffman-encoded, losslessly compressed pixel values.

20 Claims, 5 Drawing Sheets

SYSTEM AND METHOD FOR PIXEL DATA COMPRESSION

TECHNICAL FIELD

This application is directed, in general, to a data compression and, more specifically, to a system and method for compressing pixel data.

BACKGROUND

Digital photography has become commonplace. Whether the photography is done with a dedicated still camera, a videocamera, or a smartphone having a camera or video function, the high-level procedure is the same. Optics are employed to focus an image of a scene being photographed on a rectangular photodetector array. On command, the photodetector array captures the image as an array of picture elements, or pixels. The pixels are transferred over a bus to a processor and eventually gets written to memory. Additional images may then be captured using the array.

As consumers are aware, today's cameras and smartphones are offering ever-increasing image resolution, expressed in terms of millions of pixels, or megapixels, ever-increasing contrast (e.g., color) depths and ever-increasing rates at which these high-resolution images can be taken. Increasing resolutions, contrast depths and image rates tax the bandwidth of the bus that is responsible for moving the images to the memory. However, compounding these demands are less-apparent advances in image processing in which multiple images are captured in rapid succession, processed and reassembled to allow images to be taken under low-light conditions, increase image depth-of-field, allow the image plane to be changed after-the-fact or reduce the blurring, often called "shutter shake," that results from camera movement. These image processing techniques further tax the bus, which must now convey the pixels of each of the multiple images to the memory. Fortunately, buses have, so far, been able to accommodate the ever-increasing bandwidth requirements.

SUMMARY

One aspect provides a system for pixel data compression. In one embodiment, the system includes: (1) a differential pulse code modulation (DPCM) encoder operable differentially to compress the two pixel values losslessly to yield two losslessly compressed pixel values and (2) an entropy encoder coupled to the DPCM encoder and configured to receive and entropy-encode the losslessly compressed pixel values using a tiered technique to yield entropy-encoded, losslessly compressed pixel values.

Another aspect provides a method of pixel data compression. In one embodiment, the method includes: (1) differentially compressing the two pixel values losslessly to yield two losslessly compressed pixel values and (2) Huffman encoding the losslessly compressed pixel values using a tiered technique based on magnitudes of differences between the two pixel values to yield entropy-encoded, losslessly compressed pixel values.

Yet another aspect provides a smartphone. In one embodiment, the smartphone includes: (1) a processor, (2) memory, (3) a bus coupling the processor and the memory and (4) a system for compressing pixel data for transmission over the bus. In one embodiment, the system includes: (4a) a DPCM operable to receive two pixel values and differentially compress the two pixel values losslessly to yield two losslessly compressed pixel values and (4b) a Huffman encoder coupled to the DPCM encoder and configured to receive and Huffman-encode the losslessly compressed pixel values using a tiered technique to yield Huffman-encoded, losslessly compressed pixel values.

BRIEF DESCRIPTION

Reference is now made to the following descriptions taken in conjunction with the accompanying drawings, in which.

DETAILED DESCRIPTION

Figure 1:
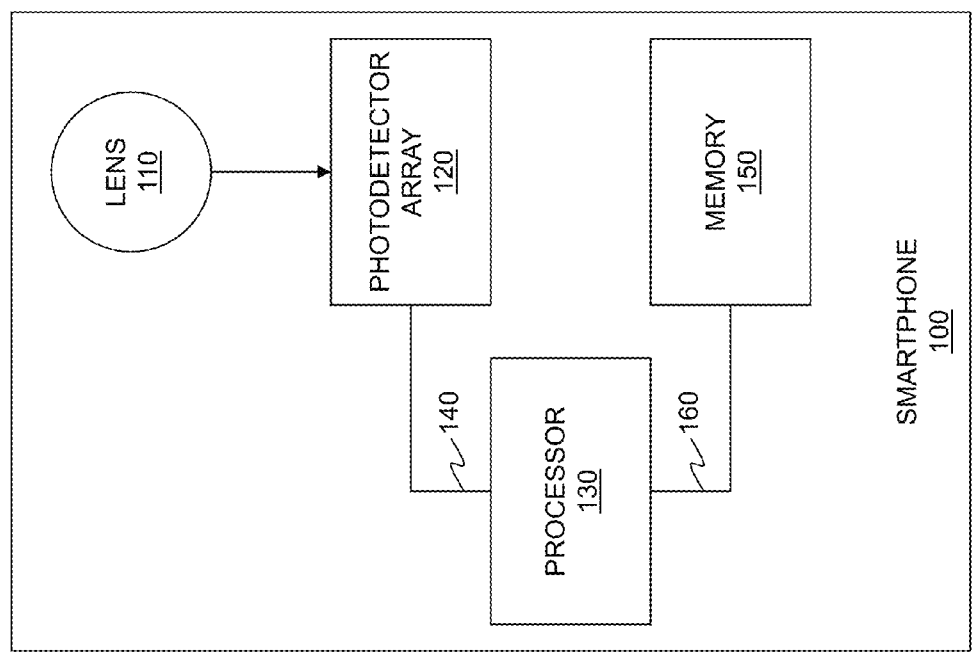
FIG. 1 is a high-level block diagram of one embodiment of a smartphone having a camera or video function.

As stated above, camera and smartphone buses have been able so far to accommodate the ever-increasing bandwidth requirements presented by the above-described increases in resolution, images rates and image processing sophistication. It is realized herein that buses are about to reach their limits, and further that, while buses can be made wider and faster to provide greater bandwidth, such buses also require more area and increase the camera and smartphone cost.

It has been realized that pixel data can be compressed for communication over a bus, and that compression extends the design life of current camera and smartphone buses. The well-known Camera Serial Interface (CSI) promulgated by the MIPI® Alliance (http://www.mipi.org/) employs compression to communicate pixel data. However, CSI employs lossy compression, which intuitively seems superior because it yields greater compression than does lossless compression.

However, while some loss can be tolerated in image compression, it is counterintuitively realized herein that it is unnecessary to tolerate loss. It is realized herein that lossy compression's advantage over lossless compression in terms of degree of compression is tolerably small. More importantly, it is realized herein that lossy compression requires feedback to manage error, and that feedback requires data dependency, making it less amenable to parallel processing.

It is still further realized that the pixels of typical images have characteristics that make them it attractive for encoding using DPCM. It is still yet further realized that DPCM-encoded pixels have statistical characteristics that make them attractive for subsequent entropy coding. It is still yet further realized that DPCM encoding may be employed for transmitting an image between a processor and a memory even if another compression technique, such as CSI, is employed to transmit an image to the processor.

It is yet still further realized that the coding dictionary required by entropy encoding could be unmanageably large given those same statistical characteristics. However, it is realized herein that differences between adjacent pixels of the same filter color tend to be small, and that a tiered technique for entropy coding has the potential to reduce dictionary size.

It is still yet further realized that restart intervals may advantageously be provided in the compressed data to make it more selectively decodable. Further, it is realized that, because that lossless entropy encoding produces compressed data at a variable rate, and while the length of the compressed data should be communicated along with the compressed data, the two need not be packed in memory in-order.

Accordingly, introduced herein are various embodiments of a system and method for performing lossless pixel data compression in which compression of adjacent pixels of the same filter color is based on a predicted value. Certain embodiments employ a tiered technique in which smaller differences between pixels are entropy encoded differently than are larger differences. Surprisingly, the tiered technique yields a substantially smaller dictionary with only a small loss of compression. Some embodiments also employ wrap-around coding, in which pixel differences are allowed to encompass the extremes of a range when they result in smaller differences. In related embodiments, restart intervals are provided, and in certain embodiments, memory is packed out-of-order to allow lengths to be extracted first.

FIG. 1 is a high-level block diagram of one embodiment of a smartphone 100 having a camera or video function. As those skilled in the pertinent art understand, a smartphone is generally characterized as having a prominent display screen and providing an application programming interface (API) to an operating system (OS) allowing third-party software applications, typically called "apps," to execute in the smartphone. Examples of current smartphones use the Android, iOS®, Windows® Phone, BlackBerry® or Bada®, Symbian®, Palm OS®, Windows® Mobile OS.

The smartphone has a lens 110 operable to focus an image of a scene being photographed on a rectangular photodetector array 120. On command, the photodetector array 120 then captures the image as an array of pixels. As those skilled in the pertinent art understand, the photodetector array 120, which may be, for example, metal oxide semiconductor (MOS) charge-coupled devices (CCDs) or complementary semiconductor (CMOS) photosensors, produce analog signals that are quantized to a particular precision. For example, in the illustrated embodiment, the precision is such that each pixel can assume a value between −1024 and 1023, representing a brightness. For color images, a color filter (e.g., a red, green and blue Bayer filter) may be placed over the photodetector array 120. Thus, each pixel represents a brightness of the color overlying that pixel. As will be described below, pixels of the same filter color are subjected to DPCM so pixel value differences arising from color differences do not adversely impact compression.

Following capture, a processor 130 causes the pixels to be transferred from the photodetector array 120 to the processor 130 over a bus 140. The pixels are then transferred from the processor 130 to a memory 150 over a bus 160. Additional images may then be captured using the photodetector array 120. As stated above, the system and method introduced herein can reduce the bandwidth required for the transfer over the bus 160.

Figure 2:
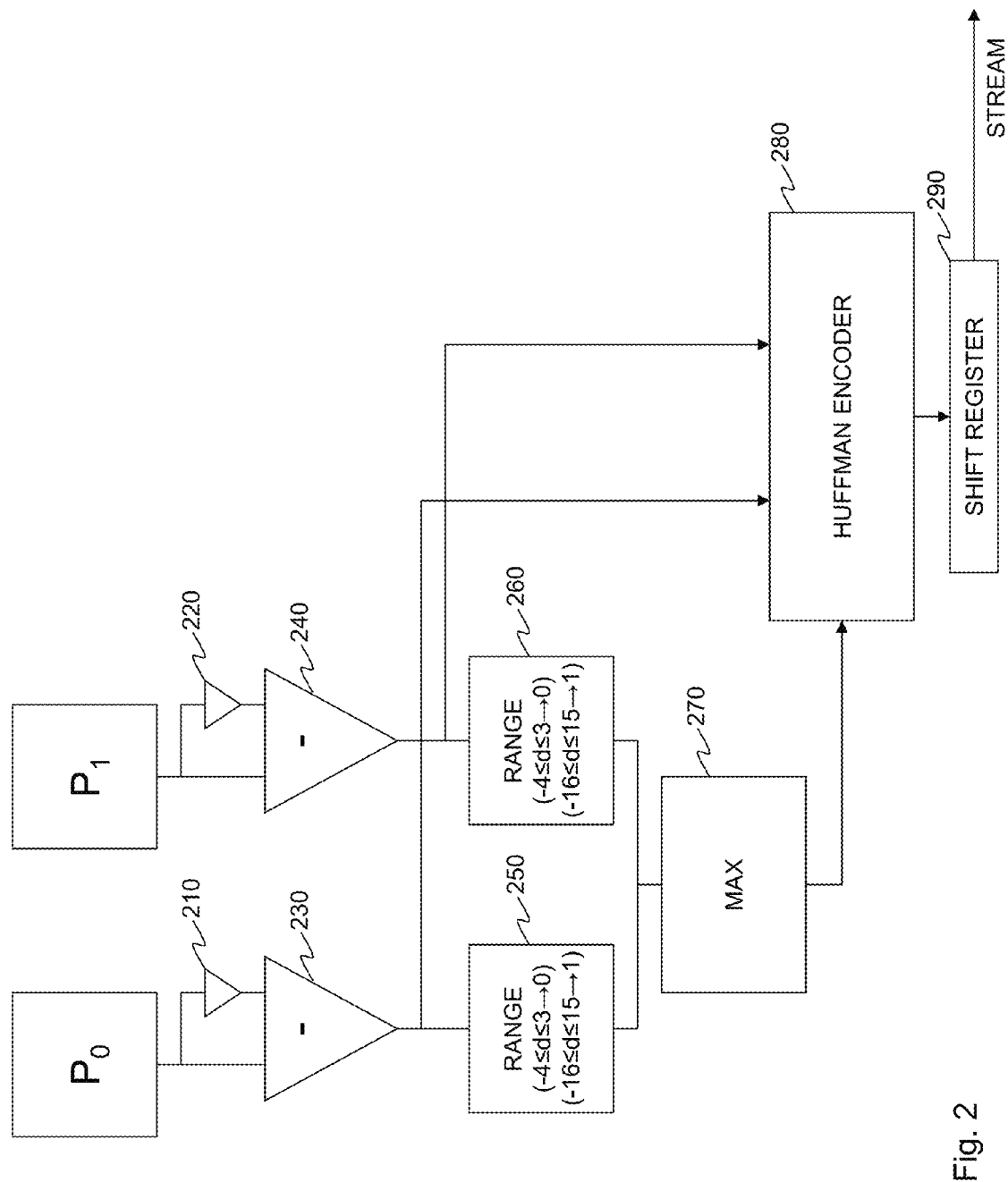
FIG. 2 is a block diagram of one embodiment of a variable-rate lossless dual-pixel differential PCM encoder.

FIG. 2 is a block diagram of one embodiment of a variable-rate lossless dual-pixel differential PCM encoder. The encoder is operable to convert two incoming pixels $P_0, P_1$ into a stream of compressed data. $P_0$ and $P_1$, together with predicted values of $P_0$ and $P_1$ produced by corresponding latches 210, 220, are provided to inputs of respective differential circuits 230, 240. The latches 210, 220 and the differential circuits 230, 240 constitute one embodiment of a DPCM encoder. The outputs of the differential circuits 230, 240 are provided to respective range detection circuits 250, 260. The range detection circuits 250, 260 are operable to provide certain output values if their input values fall in certain ranges. The range detection circuits 250, 260 enable a tiered technique to be used for subsequent entropy coding. According to the tiered technique, ranges are established, and encoding is varied for each range. The ranges may differ. However, in the illustrated embodiment, a first range is established for pixel values greater than or equal to −4 and less than or equal to 3. A second range is established for pixel values greater than or equal to −16 and less than or equal to 15.

Of course, these are not the only possible ranges and not the only way range detection circuit can work. Many other ranges are possible, depending on the characteristics of the images being compressed. For example, higher-resolution images might benefit from different ranges. The example ranges set forth above happen to be based on characteristics of example images.

If the pixel value lies in the first range, the range detection circuits 250, 260 are operable to produce a zero. If the pixel value lies in the second range, the range detection circuits 250, 260 are operable to produce a one. The outputs of the range detection circuits 250, 260 are provided to a maximum detection circuit 270, which is operable to produce an output that represents the maximum of its inputs. Thus, if its inputs are zero and zero, its output is zero; if its inputs are zero and one, its output is one, and so forth.

The output of the maximum detection circuit 270 and the outputs of the differential circuits 230, 240 are provided to an entropy encoder 280. In the embodiment of FIG. 2, the entropy encoder 280 is a Huffman encoder. The Huffman encoder 280 compresses the values of $P_0$ and $P_1$, taking the output of the maximum detection circuit 270 into account, and provides the compressed output to a shift register 290, which ultimately produces a stream of compressed data for transmission over a bus.

As stated above, memory may be packed out-of-order. Accordingly, the illustrated embodiment employs a novel memory packing technique. No matter what, the decoder needs to know how much data to read. Since a standard memory transfer unit, called an "atom," is used, some mechanism should be put in place to delineate the number of atoms encompassing the restart interval. A naïve approach involves packing the length with the first data atom. Compressing to memory therefore requires n+l atom writes (n for each datum and 1 for the length, and decompressing from memory requires n reads (one for each datum). Such approach is acceptable when memory reads predominate writes. However, it is likely that writes will occur more than reads. It is thus desirable to optimize for writes. According to the novel memory packing technique, the length is packed in the last atom, typically in the initial position. While reading requires n+l reads (i.e. the last data atom is read once to obtain the length and again to obtain the last data), writing only requires n writes. The novel, out-of-order technique is superior when memory writes predominate reads.

Also as stated above, restart intervals may be provided. Accordingly, the illustrated embodiment employs restart intervals. It is realized herein that it may be desirable to have breaks in places other than where large discontinuities are located. For instance, a big discontinuity typically occurs at the end of a line, so it makes sense to have restart interval boundaries to occur at the ends of lines. However, boundaries of restart intervals may be located in other places, e.g., in the middle of a line if it is desirable to process only part of a line.

Figure 3:
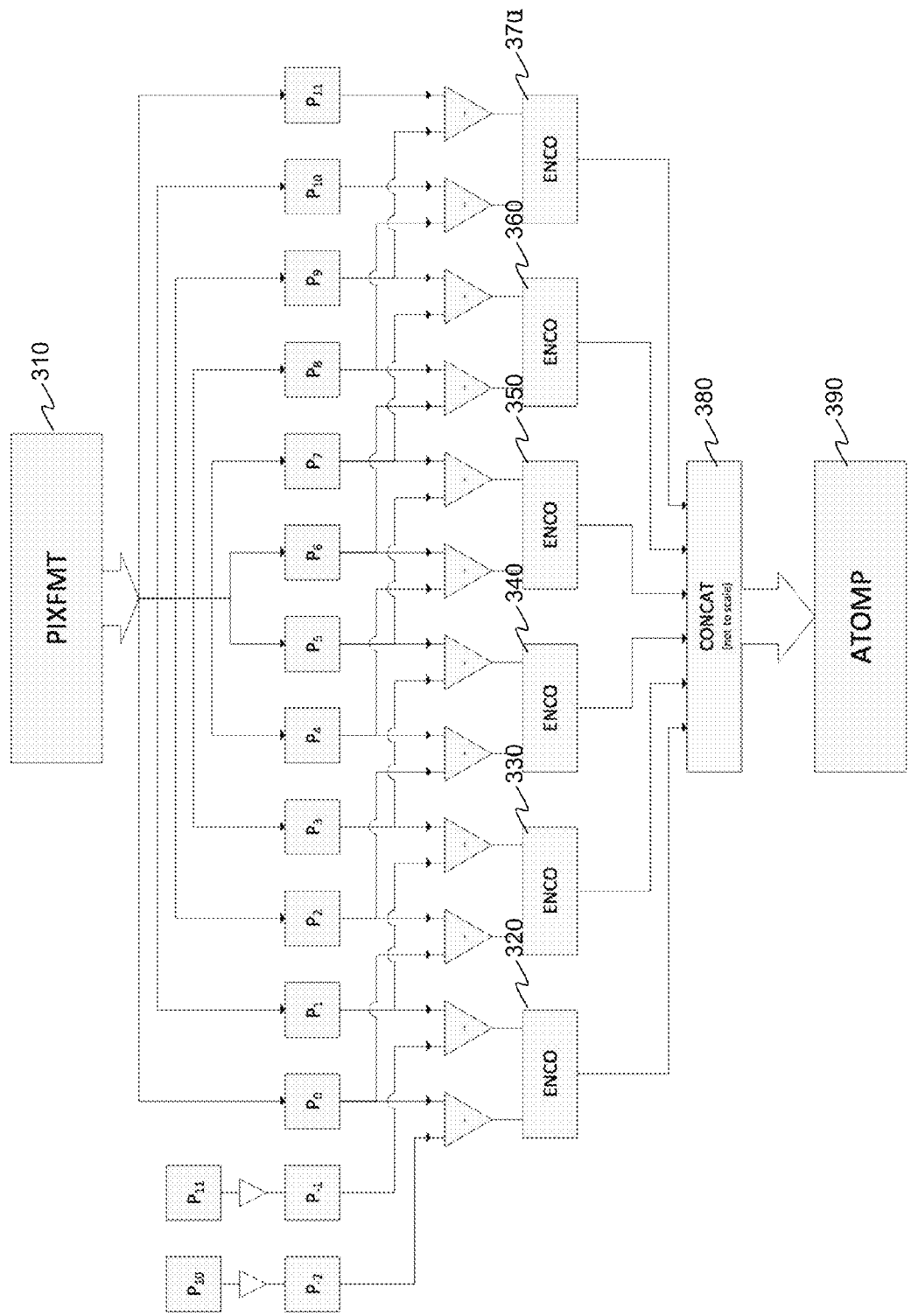
FIG. 3 is a block diagram of one embodiment of a parallel variable-rate lossless dual-pixel differential PCM encoder.

FIG. 3 is a block diagram of one embodiment of a parallel variable-rate lossless dual-pixel differential PCM encoder. Whereas the embodiment of FIG. 2 is operable to convert two incoming pixels $P_0, P_1$ into a stream of compressed data, the embodiment of FIG. 3 is operable to convert 12 incoming pixels $P_0, P_1, P_2, P_3, P_4, P_5, P_6, P_7, P_8, P_9, P_{10}, P_{11}$ into a stream of compressed data. Also, whereas the embodiment of FIG. 2 employs the last value of each pixel to predict the current value, the embodiment of FIG. 3 employs the pixel that is two places over from a given pixel to predict its current value (e.g., $P_0$ is used to predict $P_2$, $P_6$ is used to predict $P_8$, etc.). As FIG. 3 shows, a block PIXFMT 310 provides the pixels $P_0$, $P_1$, $P_2$, $P_3$, $P_4$, $P_5$, $P_6$, $P_7$, $P_8$, $P_9$, $P_{10}$, $P_{11}$, together with their predictive pixels, to unreferenced differential circuits. The outputs of the unreferenced differential circuits are provided to encoders 320, 330, 340, 350, 360, 370. The encoders 320, 330, 340, 350, 360, 370 are operable to carry out the functions of the range detection circuits 230, 240, the maximum detection circuit 270 and the entropy encoder 280 of FIG. 3. The outputs of the encoders 320, 330, 340, 350, 360, 370, representing compressed data, are concatenated in a block 380 and provided to an atom packer 390, which is operable to implement restart intervals and the out-of-order packing technique described above.

Figure 4:
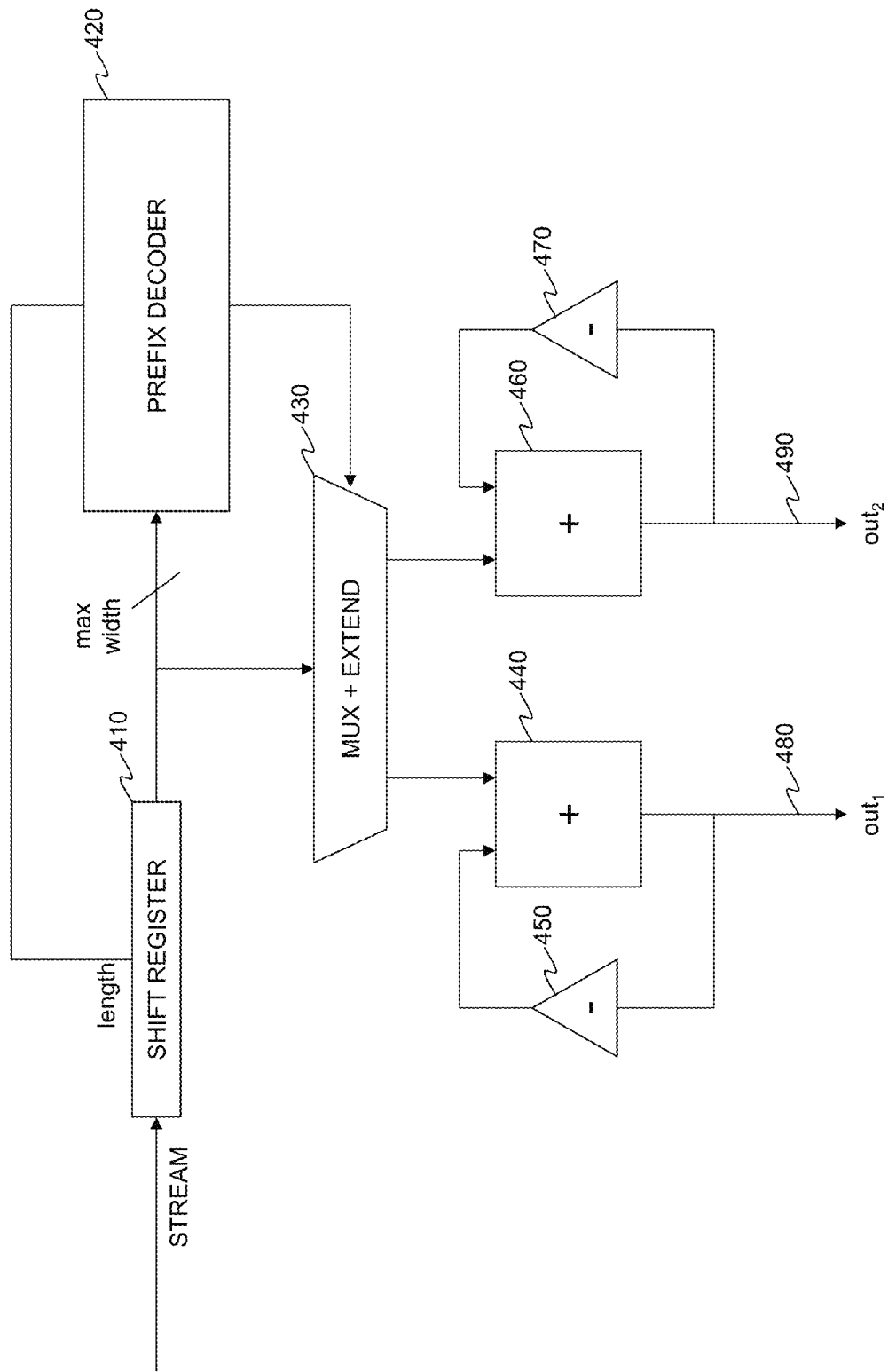
FIG. 4 is a block diagram of one embodiment of a variable-rate lossless dual-pixel differential PCM decoder.

FIG. 4 is a block diagram of one embodiment of a variable-rate lossless dual-pixel differential PCM decoder. A shift register 410 receives a stream of compressed data. A prefix decoder 420 extracts a length of the compressed data to be decided from the shift register 410, which allows the prefix decoder 420 to decode the prefix from the output of the shift register 410. The output of the shift register 410 is also provided to a multiplexer, which selects two compressed bits based on the decoded prefix from the prefix decoder 420.

The two compressed bits are provided to respective summing circuits 440, 460, which add the compressed bits to respective prior bits fed back through differential circuits 450, 470 to yield uncompressed bits 480, 480, designated in FIG. 4 as $out_1$ and $out_2$.

Figure 5:
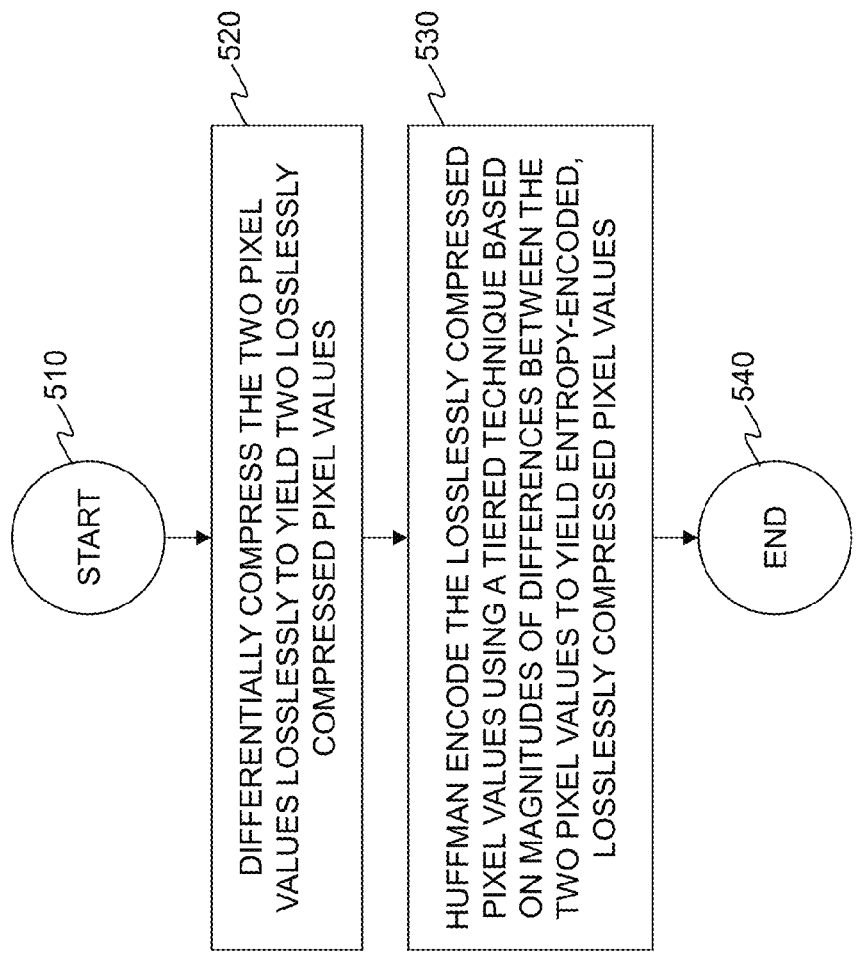
FIG. 5 is a flow diagram of one embodiment of a method of lossless pixel data compression.

FIG. 5 is a flow diagram of one embodiment of a method of lossless pixel data compression. The method begins in a start step 510. In a step 520, the two pixel values losslessly are differentially compressed to yield two losslessly compressed pixel values. In a step 530, the losslessly compressed pixel values are entropy encoded using a tiered technique based on magnitudes of differences between the two pixel values to yield entropy-encoded, losslessly compressed pixel values. The method ends in an end step 540.

Those skilled in the art to which this application relates will appreciate that other and further additions, deletions, substitutions and modifications may be made to the described embodiments.

What is claimed is:

1. A system for pixel data compression, comprising:
  a differential pulse code modulation encoder operable differentially to compress two pixel values losslessly to yield two losslessly compressed pixel values; and
  an entropy encoder coupled to said differential pulse code modulation encoder and configured to receive and entropy-encode said losslessly compressed pixel values using a tiered technique to yield entropy-encoded, losslessly compressed pixel values.

2. The system as recited in claim 1 further comprising range detection circuits coupled to said differential pulse code modulation encoder operable to provide output values based on ranges in which differences of said two pixel values lie.

3. The system as recited in claim 1 wherein said entropy encoder is a Huffman encoder and said system further comprises a shift register coupled to said entropy encoder and operable to receive said entropy-encoded, losslessly compressed pixel values.

4. The system as recited in claim 1 further comprising a shift register coupled to said entropy encoder and operable to receive said entropy-encoded, losslessly compressed pixel values along with lengths thereof, said lengths being received other than after said entropy-encoded, losslessly compressed pixel values.

5. The system as recited in claim 1 wherein said entropy-encoded, losslessly compressed pixel values are contained in a restart interval having boundaries located at other than ends of lines, a length of said restart interval packed in a last atom associated with said restart interval.

6. The system as recited in claim 1 wherein said differential pulse code modulation encoder is further operable to employ wraparound coding to compress said two pixel values losslessly differentially.

7. The system as recited in claim 1 wherein system is part of a parallel encoder operable to compress at least four pixels in parallel.

8. A method of pixel data compression, comprising:
  differentially compressing said two pixel values losslessly to yield two losslessly compressed pixel values; and
  entropy encoding said losslessly compressed pixel values using a tiered technique based on magnitudes of differences between said two pixel values to yield entropy-encoded, losslessly compressed pixel values.

9. The method as recited in claim 8 further comprising providing output values based on differences of ranges in which said two pixel values lie, said ranges selected based on image characteristics to reduce a dictionary associated with said entropy encoding.

10. The method as recited in claim 8 further comprising a shift register coupled to said entropy encoder and operable to receive said entropy-encoded, losslessly compressed pixel values.

11. The method as recited in claim 8 wherein said shift register coupled to said entropy encoder and operable to receive said entropy-encoded, losslessly compressed pixel values along with lengths thereof, said lengths being received other than after said entropy-encoded, losslessly compressed pixel values.

12. The method as recited in claim 8 wherein said entropy-encoded, losslessly compressed pixel values are contained in a restart interval having boundaries located at other than ends of lines, said method further comprising packing a length of said restart interval in a last atom associated with said restart interval.

13. The method as recited in claim 8 wherein said differential pulse code modulation encoder is further operable to employ wraparound coding to compress said two pixel values losslessly differentially.

14. The method as recited in claim 8 wherein system is part of a parallel encoder operable to compress at least four pixels in parallel.

15. A smartphone, comprising:
  a processor;
  memory;
  a bus coupling said processor and said memory; and
  a system for compressing pixel data for transmission over said bus, including:
    a differential pulse code modulation encoder operable to receive two pixel values and differentially compress said two pixel values losslessly to yield two losslessly compressed pixel values, and
    an entropy encoder coupled to said differential pulse code modulation encoder and configured to receive and entropy-encode said losslessly compressed pixel values using a tiered technique to yield entropy-encoded, losslessly compressed pixel values.

16. The smartphone as recited in claim 15 wherein said system further includes range detection circuits coupled to said differential pulse code modulation encoder operable to provide output values based on ranges in which differences of said two pixel values lie.

17. The smartphone as recited in claim 15 wherein said entropy encoder is a Huffman encoder and said system further includes a shift register coupled to said Huffman encoder and operable to receive said Huffman-encoded, losslessly compressed pixel values.

18. The smartphone as recited in claim 15 wherein said entropy encoder is a Huffman encoder and said system further includes a shift register coupled to said Huffman encoder and operable to receive said Huffman-encoded, losslessly compressed pixel values along with lengths thereof, said lengths being received other than after said Huffman-encoded, losslessly compressed pixel values.

19. The smartphone as recited in claim 15 wherein said entropy-encoded, losslessly compressed pixel values are contained in a restart interval having boundaries located at other than ends of lines, a length of said restart interval packed in a last atom associated with said restart interval.

20. The smartphone as recited in claim 15 wherein said differential pulse code modulation encoder is further operable to employ wraparound coding to compress said two pixel values losslessly differentially.

* * * * *